2 Sheets—Sheet 1.

J. F. KELLER.

Grain-Drill.

No 46,364. Patented Feb. 14, 1865.

Witnesses:
G. Breed
Eliza Hancock.

Inventor:
John F. Keller
per Daniel Breed Atty

2 Sheets—Sheet 2.
J. F. KELLER.
Grain-Drill.
No 46,364.
Patented Feb. 14, 1865.
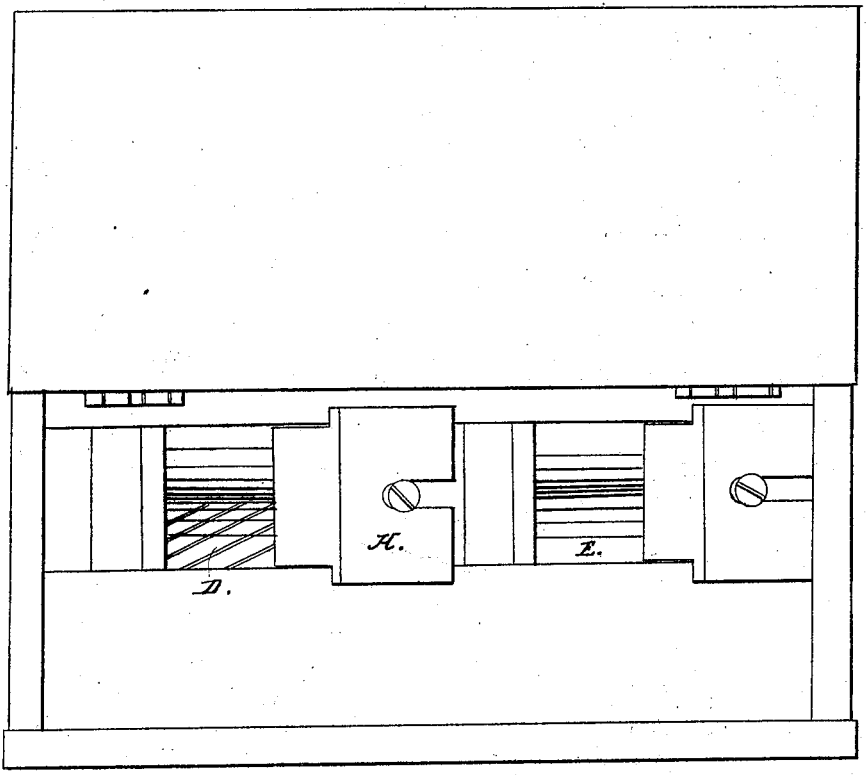
Fig. 2.
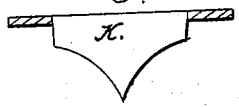
Fig. 6.
Fig. 5.
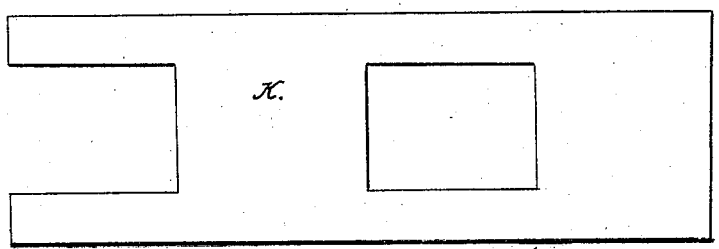
Witnesses:

UNITED STATES PATENT OFFICE.

JOHN F. KELLER, OF GREENCASTLE, PENNSYLVANIA.

IMPROVEMENT IN SEED-PLANTERS.

Specification forming part of Letters Patent No. 46,364, dated February 14, 1865.

*To all whom it may concern:*

Be it known that I, JOHN F. KELLER, of Greencastle, in the county of Franklin and State of Pennsylvania, have invented a new and useful Improvement in Seed-Planters or Wheat-Drills; and I do hereby declare that the following is a full and exact description thereof, reference being had to the accompanying drawings, and to the letters of reference marked thereon.

My invention consists in the use of an iron or solid inelastic roller in combination with an india-rubber or elastic roller, the two rollers being used as a pair of feed-rollers for wheat-drills or seed-planters; and, also, in a peculiar construction of feed-slide and feed-gage for said machines.

In the manufacture and repair of wheat-drills I have found it difficult with gum feed-rollers to regulate the feed so as to sow at a uniform speed or at the same rate per acre. Such rollers vary in size with the variations of cold and heat, and thus feed faster or slower, according to their size or their expansion by heat and contraction by cold. Sometimes the rubber is of different quality in two different rollers working together as a pair, and then one of these rollers may expand and contract more than the other. In such case the larger roller travels faster than the smaller, and therefore the rollers must slip upon each other. This slipping brings a great strain or pressure upon the rollers. The wear and damage thus produced often ruin the roller, especially by enlarging the hole which receives the shaft, and thus loosening the roller. As the feeding is done at one end of the feed-rollers, the pressure of the wheat or seed often pushes the rollers endwise, and thus wears off one end of the roller. When two rubber rollers remain pressed together for a long time they are liable to become permanently indented, and, also, they may adhere together, and thus be broken when they are again set in motion.

In order to prevent or lessen these difficulties, I have invented the combination of an iron or solid roller with a gum or elastic one. A solid roller can be easily fastened in place upon the shaft. It is always practically of the same size, and may be made smooth, so as to slip (slightly if necessary) without damage to itself or the rubber fellow roller.

Figure 1:
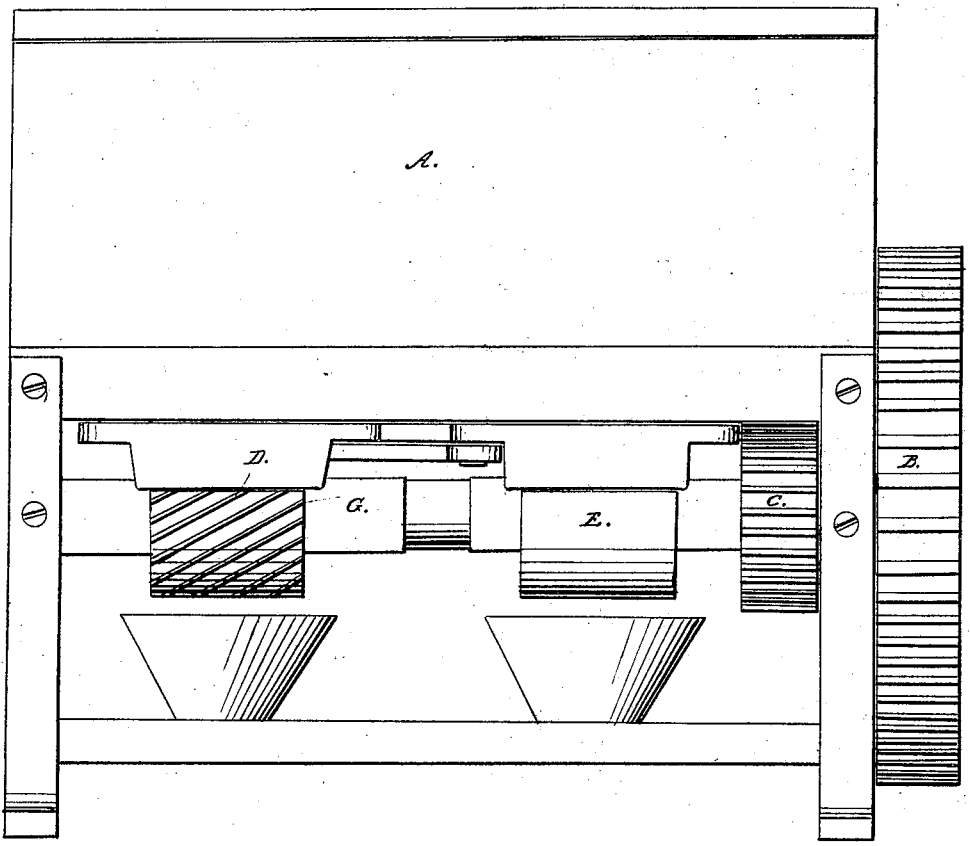
Figure 3:
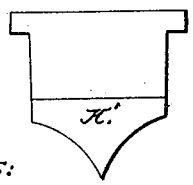
Figure 4:
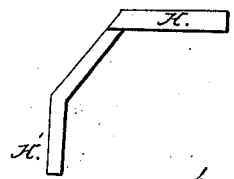

In the accompanying drawings, Figure 1 is a rear view of the feed-box, rollers, and other parts necessary for feeding, the carriage and frame of the working machine not being represented. Fig. 2 is a top or bird's-eye view of the same, the lid of the feed-box being thrown open to show the feed-rollers in place. Figs. 3, 4, 5, and 6 are detached views of part of the machine.

The feed-box A and cog-gear wheels B and C may be of the usual construction. My improved solid rollers are seen at D and E, Figs. 1 and 2. They are placed upon the shaft G in the usual manner. The rollers may be entirely smooth, as seen at the right hand in Fig. 1, or they may have spiral grooves, as shown at the left hand, or they may be otherwise cupped or grooved. As above mentioned, these solid rollers are easily fastened to the shaft G, so that they cannot move endwise or work loose. Being usually made of iron or wood, they are not liable to change in size by heat, cold, or wear. Another advantage is, these rollers are cheap and durable.

In the bottom of the seed-box is arranged a gage-piece, H, provided with a point to fit down between the rollers and prevent the seed from working beyond the gage. This pointed lower extremity of the gage-piece is seen at H in Fig. 4. The gage is made adjustable by means of a slot, into which is inserted the screw I, Fig. 2. By means of this adjustment the gage-piece may be set forward or backward, so as to increase or diminish the capacity of the feed-hole and thus regulate the rate of feed.

Under the bottom of the feed-box is a cast-iron slide, all in one piece, as seen in Fig. 5 at K. This slide is nearly inflexible, and fits the bottom of the feed-box so closely that wheat or other small grain cannot slip between the slide and the under side of the feed-box, as is often the case with the slides in common use, such slides being usually made mostly of tin attached to wires running along the edges of the slide. My slide is provided with a point, K', Fig. 6, fitting down between the tops of the rollers and preventing the wheat or seed from working past this point K'. Thus when the slide is pushed forward to diminish the size of the feed-hole the grain already resting on the rollers is pushed forward by this pointed extremity, and thus the wheat or seed cannot scatter upon the rollers. When similar points have been attached to the common tin slide they have been usually made of lead or soft metal soldered upon the tin. Such leaden pieces soon wear out, and the tin is liable to be bent, so that wheat or other small seed will work past the point or between the slide and bottom of the box, as above mentioned. This slide is worked by a lever in the usual manner.

In the drawings I have shown only two sets of feed-rollers, and they are of the working size. The slide (also shown) is only long enough to fit two feed-holes; but a full-sized machine has the usual number of pairs of rollers, (eight, ten, or more,) and slide K, above described, must be long enough to fit the number of feed-holes corresponding to the pairs of rollers.

Having thus fully described my invention, what I claim, and desire to secure by Letters Patent of the United States, is—

1. The above-described inelastic roller, in combination with the elastic roller, as a pair of feed-rollers for wheat-drills or other seed-planters, substantially as set forth.

2. The peculiar adjustable gage-piece H, the same being provided with a point fitting down between the tops of feed-rollers, substantially in the manner and for the purposes set forth.

3. The solid or cast-iron slide with tips or points fitting down between the tops of the rollers, substantially in the manner specified.

JOHN F. KELLER.

Witnesses:
 DANIEL BREED,
 EDM. F. BROWN.